April 10, 1934. O. GOSSLER 1,954,732
METHOD AND APPARATUS FOR MAKING GLASS YARN
Filed June 27, 1932  2 Sheets-Sheet 1
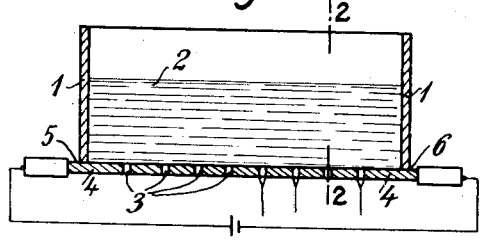
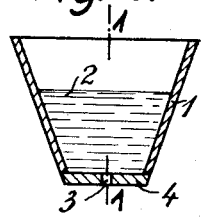
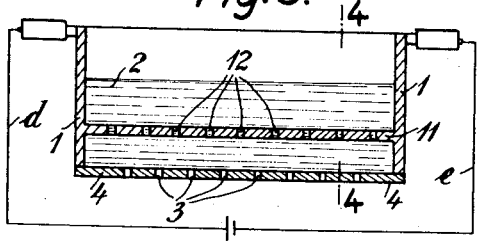
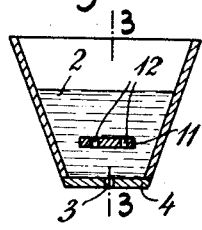
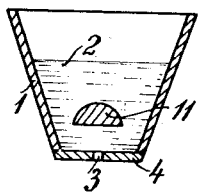
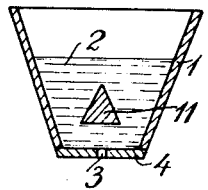
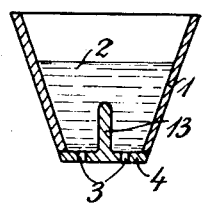
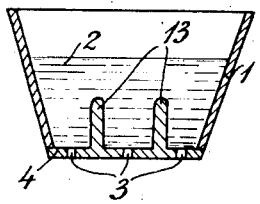
Inventor
Oscar Gossler
by
Foster & Coder
Attorneys April 10, 1934.  O. GOSSLER  1,954,732
METHOD AND APPARATUS FOR MAKING GLASS YARN
Filed June 27, 1932   2 Sheets-Sheet 2

Inventor
Oscar Gossler
by Foote + Cadie
Attorneys

Patented Apr. 10, 1934

1,954,732

UNITED STATES PATENT OFFICE 1,954,732

METHOD AND APPARATUS FOR MAKING GLASS YARN

Oscar Gossler, Hamburg, Germany

Application June 27, 1932, Serial No. 619,576
In Germany April 28, 1930

7 Claims. (Cl. 49—17)

This application is a continuation in part of my copending application Serial No. 452,056, filed May 13th, 1930.

The manufacture of glass yarn in the form of thin filaments is effected by heating the glass until it forms a viscous, doughy mass and by drawing filaments out of this mass. Glass yarn has been produced by melting the glass in a melting container with openings in one side wall. The glass which is in a doughy, tough liquid condition passes out through the openings of the melting container and is drawn out with a suitable device, for example tongs, a glass rod or the like, at a high rate of speed. In this manner the viscous glass is drawn out to form very thin filaments, which solidify quickly and the strength of the same is dependent on the speed of drawing out and the degree of liquidity of the glass mass. These glass filaments are thrown on a drawing apparatus, for example a revolving drum, and the same affixed in a suitable manner by an adhesive, by friction or the like, and are spooled round the drawing apparatus whereby the glass filaments are further drawn out of the toughly, liquid mass constantly. By this means it is possible to produce extremely thin glass filaments of considerable length.

It has been shown that the process of producing the glass filaments is easily interrupted by heat fluctuations, changes in viscosity on account of nonuniform chemical constitution of the glass, due to impurities contained in the molten glass, and the thin glass filaments break off easily, so that continuous and automatic mechanical "spinning" of the glass by known methods cannot be accomplished in actual practice.

The continuity of broken off glass filaments must again be restored at the opening of the melting container, by forming new glass drops, drawing them out and affixing them to the drawing apparatus, which naturally requires constant attention, since the restoration of the continuity of the filaments has heretofore been done by hand. Accordingly the known process is impractical.

In order to obtain an automatic restoration of the continuity of broken off glass filaments, it has been proposed to let the thickly viscous glass mass drop out of the orifices disposed in the bottom of the melting vessel. As a result of the force of gravity, drops of liquid glass flowing out through the orifices and falling in free state draw thin glass fibres after them, which in a suitable manner are brought into communication with the drawing mechanism. The further drawing out of the newly formed glass filaments from the liquid mass, "the spinning process", is accomplished then by a revolving drum.

Since the liquid glass drops out of the melting container through openings and afterwards the drops which come out through the openings draw thin filaments after them, it is obvious that the temperature at the openings must be held at such a point that not only flawless dropping but also as adequate drawing of the glass filaments as possible is effected. It is essential that neither too much nor too little glass flows through the openings. Therefore the temperature in the vicinity of the openings and the width, structure and length of the nozzle canals must be exactly determined.

It has not been possible heretofore to obtain with this process and apparatus a satisfactory and continuous spinning with automatically restored continuity of broken filaments, because only a proportionally small container with a small number of openings can be used, and with this small number of openings the automatic formation of drops cannot be accomplished in a satisfactory manner, as it was not possible to supply the required temperature to the spinning or dropping surface in the required uniform manner by the known heating methods. The melting containers heretofore used were made of ceramic or similar substances. They were heated from the interior and partly were equipped with an additional heating device where the drops were formed at the opening heated by an electric current or gas. In order to heat the openings electrically, electrical heating resistances were placed in the furnace wall in the vicinity of the exits. By this arrangement satisfactory operation of the apparatus could not be achieved as the heat required for melting at the exudative orifices was not sufficient and moreover, the heating of the entire surface of the vessel was not uniform. Since the highest temperature is in the interior of the vessel at a distance from the exudative orifices, this temperature must be much higher than that actually required at the said orifices. This caused heat losses, detrimental currents in the glass mass and an overheating of the glass flux, which decreased the efficiency of the drawing or spinning process on account of devitrification and fluctuation in the viscosity of the glass flux. Also the exudation orifices cannot be made out of ceramic and other fire resistant material, because they do not possess the desired shape or the required homogeneity as regards cross section, and neither the correct length nor the correct width or form of the exudative orifices can be obtained; and furthermore these substances cannot be used because the walls of the receptacle would be attacked by the glass flux and in time destroyed.

According to the present invention, a process and apparatus for making spun glass or glass filaments is employed in which restoration of the continuity of broken glass filaments is effected by virtue of an opening at the bottom of the melting receptacle, at which drops free themselves from the molten glass mass and subsequently falling in a free state draw filaments after them and the exudative orifices through which the molten glass passes out of the melting receptacle in the form of drops are disposed in a metallic part of the melting receptacle as part of an electric circuit through which current flows to produce the heating element or in close proximity thereto.

The bottom of the melting receptacle and also the side walls or a part thereof, may be made of a substance which will conduct the electric current, and the side walls of the receptacle may be connected with electrical conducting bridges passing through the molten glass mass. The bridges may be in the form of sieves and may serve as a filter, and the electrical conducting part of the receptacle, which according to the invention, consists of a non-corrosive chemically resistant special steel, that is an alloy of iron with nickel and/or chromium, molybdenum and the like is connected in an electrical circuit and serves as a heating element. By the use of such a heating, the molten glass mass being of good electrical conductivity is in direct connection with the electrical resistance. Thus the voltage must be as low as possible, so that the electric current does not pass through the molten glass mass. This method of metal glass involves no life hazard since a voltage of from about 2 to 10 volts may be used.

Non-corrosive steel alloys of this class are well known to those skilled in the arts and the electrical properties of such alloys are also well known and can be obtained from standard textbooks and tables on these subjects. Tables of this character may be found in many books such as the Handbook for Electrical Engineers (Pender), published by John Wiley & Sons of New York, where on page 1223 of the edition of 1917 is given a table of the resistivity and temperature coefficient of resistance of common metals and alloys. The composition and properties, both chemical and physical, of such alloys being thus well known to those skilled in the art, it is not deemed necessary to set forth herein any specific composition of alloy or to specify the electrical resistivity of the alloy to be used since a proper alloy may be readily selected for the purpose from among those shown in such tables. It may be mentioned, however, that the electrical resistivity of the alloy used must be small in proportion to the resistivity of molten glass since it is essential that the current flow through the molten glass shall be negligible to prevent electro-chemical effects in the glass tending to change its composition.

In the drawings a form of the invention is set forth by way of example.

Fig. 1 shows a melting receptacle in perpendicular longitudinal section, taken on line 1—1 of Fig. 2.

Fig. 2 is a cross section on line 2—2 of Fig. 1.

Figure 3 shows another form of construction in perpendicular longitudinal section on line 3—3 of Fig. 4.

Fig. 4 is a cross section on line 4—4 of Fig. 3.

Figures 5–13 show other forms of construction of the melting vessel in perpendicular cross section.

Figure 9:
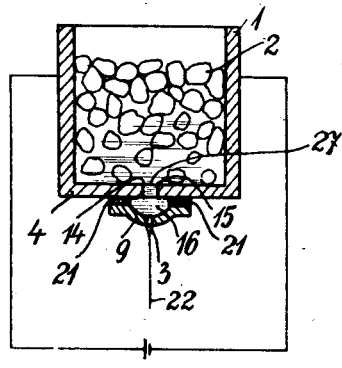

As set forth in all figures of the drawings, the glass melting vessel consists of side walls 1 and a bottom portion or base 4. The base 4 may be provided with orifices 3 for the outflow of glass mass 2. The orifices 3 through which the glass passes out of the vessel are, according to the invention, disposed in the base or in the vicinity of the base 4 of the melting receptacle, so that by virtue of the specific gravity of the thickly viscous glass, drops of glass form at the base orifices 3, which therefore fall by virtue of the force of gravity and subsequently draw out fibres or filaments after them.

According to the invention the melting receptacle 1 or merely the base 4 thereof or a part, which is in the immediate vicinity of the drawing apparatus, is made of a metallic substance capable of conducting the electrical current, but which substance resists attack of the glass flux and which metallic substance has a comparatively low specific electrical conductance.

For this purpose a special non-corrosive steel, so called, is used, for example an alloy of iron with carbon, nickel and/or chromium, molybdenum or the like have proved satisfactory. According to the invention the base plates 4 or the whole melting receptacle, or only that part of the melting receptacle in the vicinity of the exudation orifices may be made of such a resistant alloy. In commencing operations, these portions of the melting receptacle made of electrically conducting material are connected with an electrical circuit for example at 5 and 6, whereupon the above mentioned metallic portions serve as an electrical heating resistance, which is heated by the flow of an electric current therethrough.

By these electrically heated metallic portions the glass mass 2 is melted and during the manufacture of the filaments it is held at the required temperature, so that a continuous exudation of the glass as well as satisfactory drop formation, and the subsequent flow of the glass mass 2 out of the orifices 3 is guaranteed.

The subsequent flow and the exudation of the glass mass is dependent on the fluctuating condition of the molten mass in the melting receptacle, as well as changed thereby. It has been shown that an improvement of the spinning process can be effected if the apparatus is constructed as shown in Fig. 9, for example. According to this modification the base plate 4 of the melting receptacle 1 has a small outlet slit 27 in longitudinal direction. Below this slit a nozzle plate 9, which is insulated from the base 4 of the melting receptacle, is so connected that the orifices or nozzles 3 are located below the slit 27 of the base plate, and preferably in such a manner that the side walls 14 and 15 of the slit 27, the connected insulation 21 and the nozzle plate 9 are so disposed with respect to the base 4 of the melting receptacle that a separately located compartment or ante-chamber 16 is formed, which communicates with the melting receptacle 1 containing the glass mass 2, by virtue of the slit 27. By means of the slit 27 non-molten glass is retained and the molten glass flows into the compartment 16, where the glass flux settles and clarifies. From the nozzle 3 of the nozzle plate 9 a glass drop then passes out, which is subsequently drawn out to a filament 22.

This form of receptacle may be heated by connecting the walls 1 of the receptacle in an electric circuit as shown in Figure 9. In this case the orifice plate 9 is not heated. Also the receptacle 1 as well as the orifice plate and/or the base 4 could be heated, or the orifice plate 9 alone could be heated.

Figure 10:
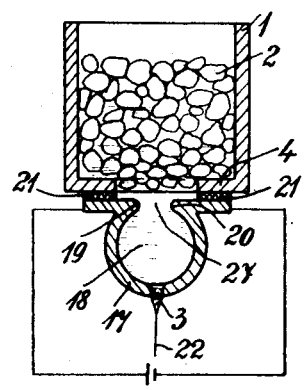

In Fig. 10 another modification of the invention is shown, where also by virtue of an insulation 21 an ante-chamber 18 is applied to the perforated base of the melting receptacle 1, by means of an especially formed orifice plate 17. As Fig. 10 shows, the orifice plate 17 consists of a channel or the like of tubular or similar cross section, which appears from the interior of the melting receptacle as a slit or opening, from which flange-like members extend outwardly for the purpose of securing it to the base of the melting receptacle. The slit 27 is disposed in vertical alignment with the orifice 3. The narrow outlet slit 27 formed by the side walls 19 and 20 represents a filter or a sluice for the purpose of permitting only molten glass to enter the ante-chamber, where it settles and clarifies and where by means of a sensitive temperature regulation the exact spinning temperature is maintained. From the orifices 3 drops of glass are exuded, and these subsequently draw filaments 22 after them. This construction operates so that the influence of the weight of the glass mass in the vessel upon the quantity of glass exuded is compensated for. In this construction the receptacle and the nozzle plate may be heated. The receptacle and the plate may be separately heated.

While heretofore the base plate 4 of ceramic receptacles must be made of strong material, the heated part, especially the base plate 4 of the present melting receptacle, can be formed as desired and can be as strong as desired. Thus the temperature of the base, the size of the orifices, the length and form of the orifices can be accurately determined. Moreover a metallic substance whose electrical resistance is less than that of the glass flux can be chosen, and one that will function with an E. M. F., of such a low voltage, so that a flow of electric current through the liquid glass 2, which is a fairly good conductor of the electric current, is prevented. Thus an electrolytic decomposition of the fluxed glass and an uneven heating is prevented, which would occur as a result of fluctuations of the electrical resistance of the glass flux, f. i. fluctuations of the height of the molten glass mass.

Furthermore it is of particular importance that the melting receptacle 1 constructed according to the present invention can be operated by charging the furnace from above, withdrawing from the bottom. The path of the glass to the exit is along the shortest path according to the co-current principle, that is uni-directional, so that the glass mass may be introduced at the top and withdrawn at the base orifices. It is well known that liquid glass devitrifies if it is held for a sufficient length of time at a temperature in the vicinity of its solidification point, which is in the vicinity of the temperature of spinning or drawing. The devitrification of the glass causes it to assume a crystalline character and lose its amorphous, glassy properties. It is opaque and brittle, similar to porcelain and cannot be further shaped.

If, as according to the invention, the heating takes place in the immediate vicinity of the glass exit orifices at the base 4 of the melting receptacle 1, it can be regulated in such a manner that only so much glass is melted as flows through the drawing out orifices. In this manner, the holding of the glass mass for sufficient time to decompose and devitrify is avoided, since the amount of liquid glass at the base 4 of the melting receptacle 1 is proportionately small, and it flows without delay through the exudation orifices, while a corresponding amount of glass cullets descends from the upper part of the furnace shaft to the bottom.

Figure 12:
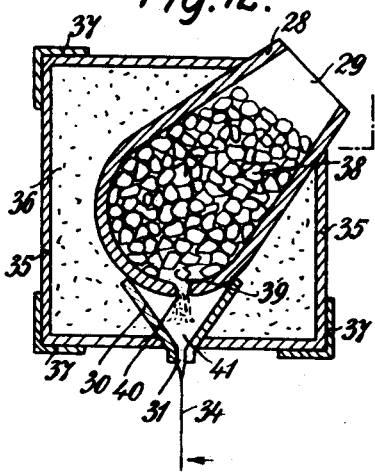
Figure 13:
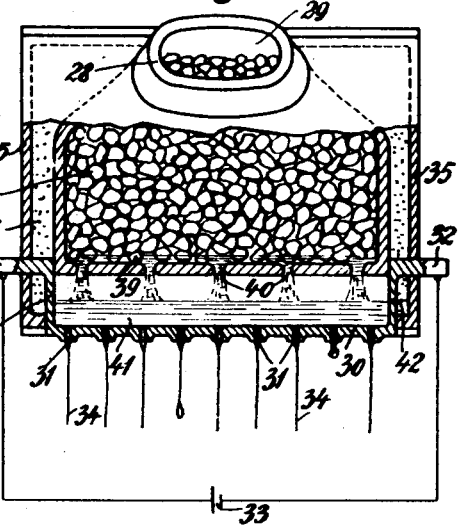

As shown in Figures 12 and 13 the arrangement according to the invention may also comprise a melting receptacle 28 which is disposed separately from the heating bar 30. The melting receptacle 28 consists preferably of chamotte or the like and is in the form of an elongated pipe having a cross section resembling that of a Bessemer converter or the like having a charging opening 29 which preferably is arranged to one side so that the cullet 38 can conveniently be introduced. At its lower end the melting receptacle 28 has a series of orifices 40 which are disposed over the melting trough 30 which in accordance with the invention is made of corrosion resistant metal or metal alloy.

The melting trough 30 is so constructed that it can receive and support the lower part of the melting receptacle 28. At the ends the melting trough 30 is closed by end surfaces 42 to render it capable of receiving the liquid glass. The end surfaces 42 are each provided with a lug 32 for connection to a source of current 33.

For the purpose of avoiding heat losses, the melting receptacle 28 and the metallic melting trough 30 are preferably accommodated in a housing 35 of sheet iron which may advantageously be reinforced by corner pieces 37. The entire housing 35 is preferably filled with a heat insulating layer such as kieselguhr, asbestos, ground chamotte or the like in order to avoid losses by radiation.

In order to start work with the device as shown in Figures 12 and 13, cullet 38, broken glass or the like is introduced into the melting receptacle 28 through the charging opening or the charging shaft 29 and the heating bar 30 is heated by closing the circuit with the source of current 33. The heat generated in the heating bar is transferred to the lower part of the melting receptacle 28 so that the cullet fuses and forms at 39 a flux which flows off through the apertures 40 into the heating trough 30 and here collects to form a layer of fused glass 41. In this melting trough 30 the glass mass 41 is brought to the requisite temperature in order to attain the viscosity requisite for spinning glass. The glass mass 41 drops downward through the orifices 31 in the melting bar 30 and in their fall the glass drops draw a thread 34 after them and drop on to a spinning or spooling device, not shown, by means of which the threads 34 are further drawn out or spun out.

Figure 11:
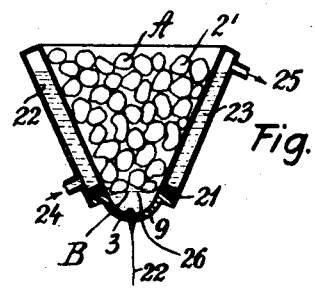

In order to facilitate the descent of the broken glass and to prevent the conglomeration of the same in the zone of the molten glass, where complete melting heat has not taken place, and furthermore to limit the melting and the simultaneous outflow to as short a path and as short a time as possible, the walls of the furnace at points above the heated zone can be cooled, as shown for example in Figure 11. The cooling can be effected by a cooling jacket through which water or air circulates, or by air cooling ribs of known construction.

In Figure 11 there is provided a cooling jacket 22 and 23, disposed in the side walls of the melting receptacle, which have at one point the cooling means inlet 24 and at another point the exit 25. The lower part of the cooler is suitably provided with insulation 21 to isolate it from nozzle plate 9, which alone is heated. In this modification, the walls of the melting receptacle are cooled, so that the cullets 2' do not adhere to or enamel the walls of the receptacle, but are free to descend into the mass as the glass below drops out of the nozzle 3 and is drawn out. Probably at the zone 26, the full melting temperature is first attained, which temperature is acquired from the heated orifice plate 9 and the molten glass flows into the hollow chamber of the arched orifice body 9, descends through the orifices 3, falls in shape of drops drawing filaments 22 behind them. The glass moves through the melting receptacle therefore in the direction A—B in the shortest path from above to below and only so much glass is melted as is required for continuity of the spinning operation, so that the glass mass is not held very long at its devitrifying temperature, as has already been shown.

By virtue of the maximum heating effect at the exudation orifices 3, a direct transfer of heat from the heating surface to the glass melt is effected. The heating surface made according to the present invention is not overheated and therefore is in contradistinction to other processes and the glass mass is brought to such a temperature as is required for exudation, spinning and the like. Devitrification and change of the chemical constitution, as has been shown, do not ensue.

The cleaning and replacing of the heating elements and the glass extruding orifices is simple, since the base plate can be easily removed from the melting receptacle. In contradistinction to the hereto employed melting receptacles made from ceramics or the like, the receptacles made according to the invention, of non-corrosive steel are practically indestructible and very reliable in operation.

The melting receptacle of the present invention will not crack by reason of the heating and discontinuance of the electric current. Also the metal receptacle can be heated up and made ready for operation in a minimum time.

The resistance and good shaping adaptability of the material makes possible the manufacture of receptacles of any desired shape. The base plates or the walls of the receptacle can be made so as to possess ribs 13 or bridges 11 for guaranteeing load carrying capacities when intensively heated to melt a difficultly fusible type of glass, the ribs or bridges being disposed in the interior of the receptacle. The bridges 11 may be provided with orifices 12, as shown in Figures 4–8. By this means, a filtration of the glass flux is effected and stoppage of the exit orifices 3 is avoided.

By the present invention it is made possible to perfect the forming of a drop, the separating of the produced drop from the remaining molten glass mass and the production of a thin glass filament by the fall of the drop, thus drawing a thin glass filament after it.

The fundamental problem in consideration and the process of producing glass filaments by the dropping of a heated glass-mass may be explained more clearly by the following example:

If for instance a glass rod of cylindrical shape fixed in a vertical position is heated over its total length but in a not uniform manner, the softening body of glass will lengthen by its own weight and thus will draw out. At the point of highest temperature a stricture takes place and the body of glass separates in two parts. In this example thus, the drop separates at the hottest point from the remaining part of the glass rod, the drop resulting from the lower part of the glass rod. If, however, the zone of the highest temperature extends over a broad range, in lieu of a round small drop, a long thin rod is drawn out and by further drawing the following thin filament will tear off. Therefore if a drop is to be separated from a glass rod in such a manner, that the drop continuously draws a filament after it, always the lower end of the vertical rod must be heated within a relative small range at the required spinning temperature.

In a similar manner a drop separates from a molten glass mass drawing a thin filament after it. In order to illustrate this, a vertical liquid glass cylinder separated from the liquid glass mass above the exuding orifice of a melting vessel may be supposed. The glass cylinder may have the same diameter as the orifices. Thus the separation of a drop from such a cylinder of liquid glass and the drawing of a thin filament by the falling drop depends on the same circumstances as explained above with respect to a solid glass rod.

However the circumstances in case of a liquid glass mass are more complicated and unfavorable, especially as the drop only can form itself at a certain fixed point namely at the outer edges of the exudative orifice, where it must separate itself from the remaining liquid glass mass.

If the highest temperature in this case is not concentrated to the walls of the exudative orifice or to its direct vicinity, the dropping process is seriously detrimented if the point of the highest temperature and the point where the drop separates do not coincide. By increasing the temperature for instance by using heating elements embedded into the interior of the melting vessel, the hottest zone is not in the interior of the exudative orifices, i. e. not at the point, where the drop ought to be formed. By installing additional heating elements in the walls of the melting receptacle in the vicinity of the exudative orifices, the zone of the highest temperature becomes too broad and the above described lengthening of the drop to a thick rod results. Thus instead of drops long rods are obtained and the filament drawn after is of such a diameter that it cannot be wound up by a rotating spinning drum and the automatic restoration of the interrupted continuity of glass filaments, that is automatic spinning of glass cannot be effected with the known process or devices. According to this invention however, the most essential feature of which is to transfer the zone of highest temperature to the inner walls of the spinning nozzles, the automatic spinning of glass filaments and the automatic restoration of the interrupted continuity of glass threads by falling glass drops has first been solved in a suitable technical and economical manner.

I claim:

1. In combination, a corrosion resistant steel receptacle of relatively high electrical conductivity, perforated bridges integral with said receptacle and spaced from the bottom thereof, and means for supplying electric current to said receptacle.

2. Apparatus for continuously spinning glass threads comprising a metallic melting receptacle, a housing enclosing said melting receptacle, a non-corrosive steel alloy ante-chamber disposed below and communicating with said melting receptacle, said ante-chamber having an exudation orifice, an outlet slit at the bottom of said melting receptacle permitting exudation of molten glass into said ante-chamber and means for supplying electric current to said ante-chamber for heating purposes.

3. Apparatus for continuously spinning glass threads comprising a non-corrosive metallic melting receptacle having a base plate carrying a small outlet slit, a nozzle plate having an exudation orifice, electrical insulation disposed between the said base plate and the said nozzle plate and means for supplying electric current to said melting receptacle for heating purposes.

4. Apparatus for continuously spinning glass threads comprising a non-corrosive metallic receptacle, a chamber constructed from a non-corrosive steel alloy disposed between the bottom portion of said metallic receptacle and communicating with said receptacle by means of an outlet slit, electrical insulation disposed between said metallic receptacle and said chamber and means for supplying electric current to said metallic chamber for heating purposes.

5. Apparatus for continuously spinning glass threads comprising a non-corrosive metallic melting receptacle carrying at least one small outlet at the base thereof, a nozzle plate having at least one exudation orifice, means for supplying electric current to said nozzle plate and a housing enclosing said melting receptacle.

6. The method of heating glass for producing glass filaments which consists in providing a receptacle having an outlet opening in its bottom, said receptacle being of metal having at the temperature of molten glass a lower resistivity than molten glass to the passage of electric current and forming a resistance element for electric current, supplying the receptacle with a charge of molten glass, and passing sufficient current through the metal of the receptacle to heat said receptacle to a desired temperature.

7. The method of heating glass for producing glass filaments which consists in providing a receptacle having an outlet opening in its bottom, said receptacle being of metal having at the temperature of molten glass a lower resistivity than molten glass to the passage of electric current and forming a resistance element for electric current, supplying the receptacle with a charge of molten glass, and passing sufficient current through the metal of the receptacle to heat said receptacle to a desired temperature, while maintaining the voltage of the current sufficiently low to inhibit the passage of current through the molten glass.

OSCAR GOSSLER.